Sept. 24, 1957 G. H. GILMAN 2,807,205
FRUIT JUICERS
Filed April 6, 1955 2 Sheets-Sheet 1
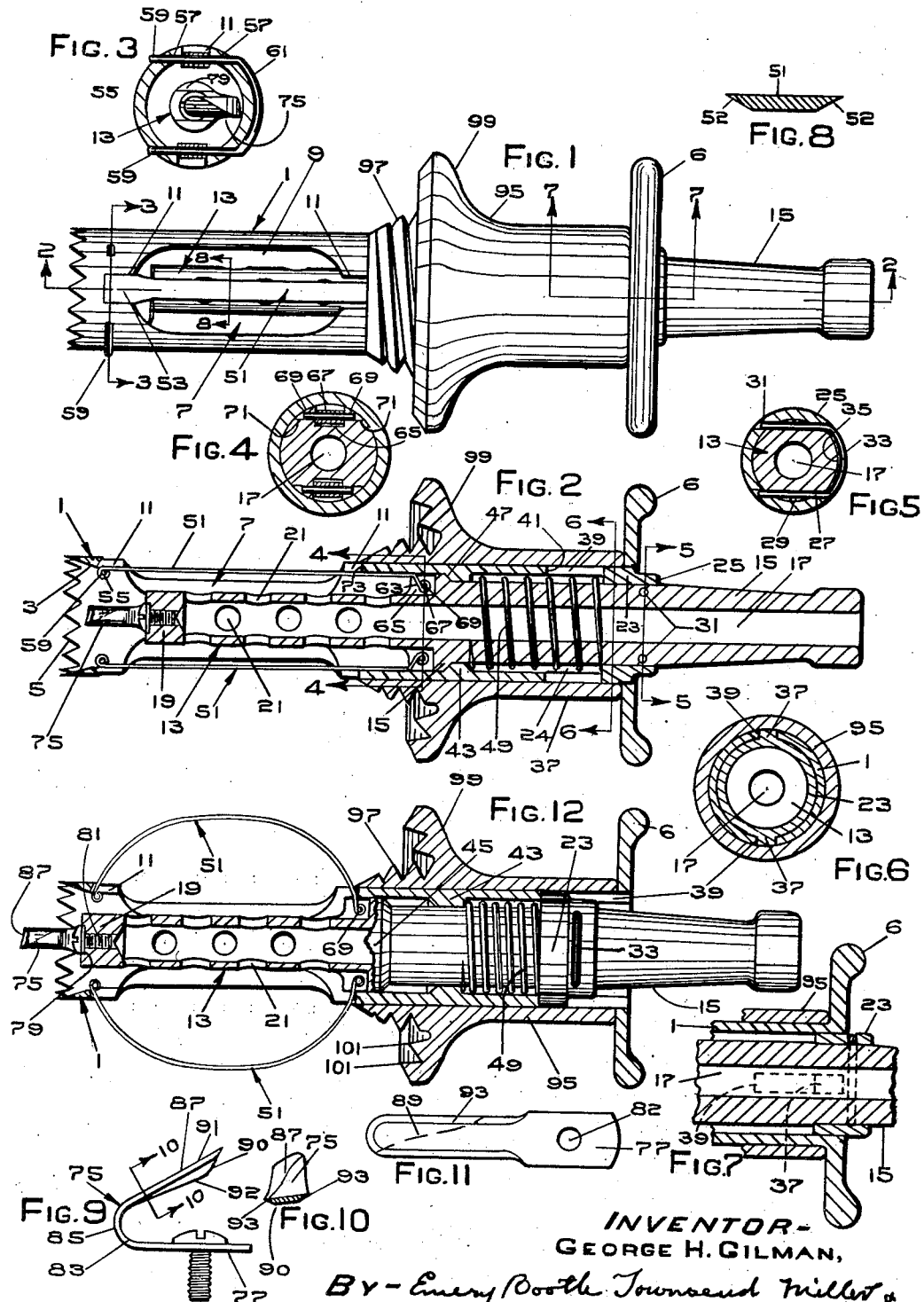
INVENTOR—
GEORGE H. GILMAN,
BY — Emery Booth Townsend Miller &
Weidner
ATTYS.

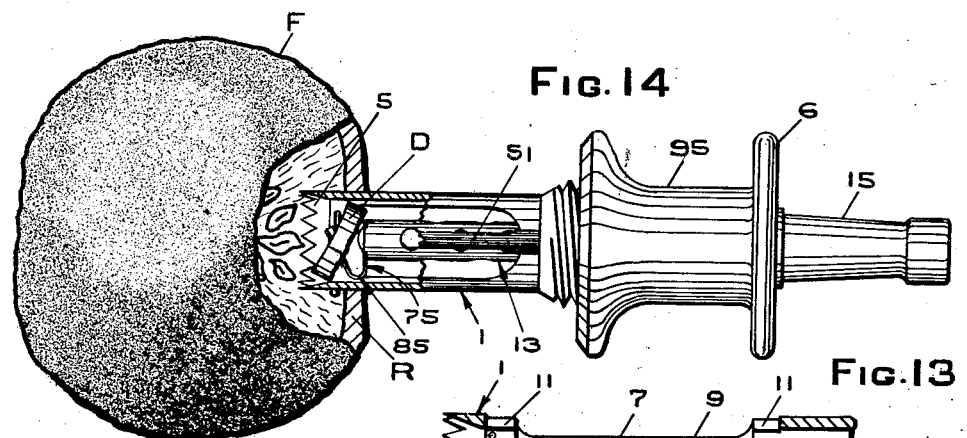
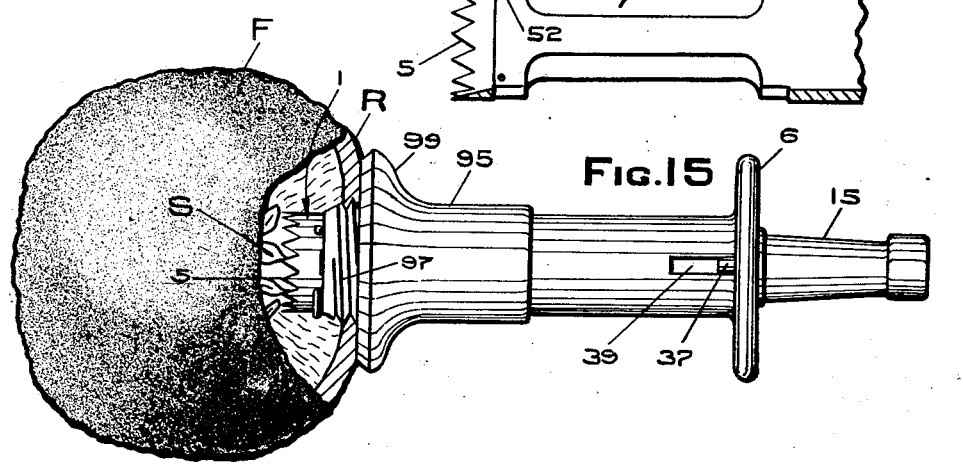
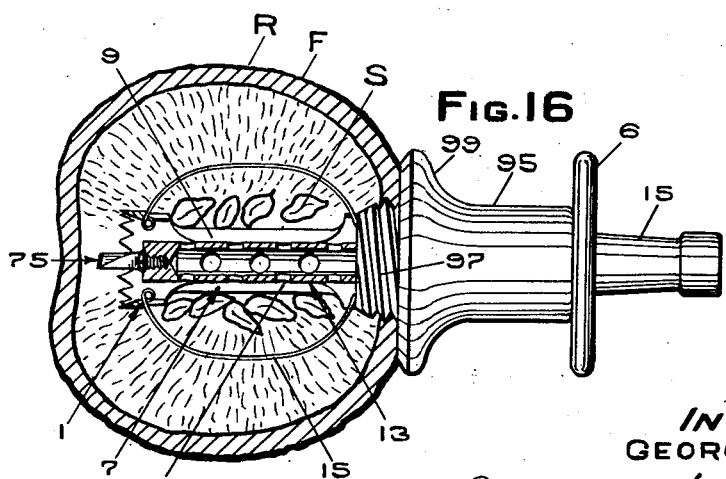

United States Patent Office 2,807,205
Patented Sept. 24, 1957

2,807,205
FRUIT JUICERS
George H. Gilman, Belmont, Mass.
Application April 6, 1955, Serial No. 499,592
8 Claims. (Cl. 100—108)

My invention relates to so-called "juicers" for extracting juice from oranges and other citrus fruits by squeezing or kneading the fruit to eject the juice when the juicer is applied thereto, or, when the juicer is so applied, by sucking the juice from the fruit.

The invention, which has among its objects an improved device of the above character having provision for effectively extracting the juice to the exclusion of the seeds and pulp of the fruit, will be best understood from the following description when read in the light of the accompanying drawings of an embodiment of the invention selected for illustrative purposes, while the scope of the invention will be more particularly pointed out in the appended claims.

In the drawings:

Fig. 1 is an elevation of a juicer according to the invention;

Figs. 2 and 3 are sections on the lines 2—2 and 3—3, respectively, of Fig. 1;

Figs. 4, 5 and 6 are sections on the lines 4—4, 5—5 and 6—6, respectively, of Fig. 2;

Figs. 7 and 8 are sections on the lines 7—7 and 8—8, respectively, of Fig. 1 with parts omitted, Fig. 8 being on an enlarged scale;

Fig. 9 is a side elevation of one of the cutters of the device, on an enlarged scale, in assembled relation with an associated screw for securing that cutter to the part supporting it;

Fig. 10 is a section on the line 10—10 of Fig. 9, on an enlarged scale;

Fig. 11 is a development of the cutter according to Figs. 9 and 10;

Fig. 12 is a section corresponding to Fig. 2, with parts in a different operative position and parts in elevation;

Fig. 13 is a fragmentary view showing a detail, and corresponds to a section on the line 2—2 of Fig. 1 with parts broken away and parts omitted; and Figs. 14 to 16 are views illustrating steps of the operation of applying the device to an orange or the like for extracting juice therefrom.

Referring to the drawings, the device illustrated comprises a tubular member 1 of internal and external circular cross-section. This member, which conveniently may be of hard molded plastic, is interiorly beveled or tapered to a knife edge at its forward end as indicated at 3, such edge being serrated to form an annular series of sharp pointed teeth 5 having opposite unsharpened flat sides, such series of teeth forming in a sense what amounts to a hollow cylindrical saw. This member at its rearward end is shaped to form at its exterior a radially extending handwheel 6 integral therewith.

As shown, the forward portion of the tubular member 1 is formed at each of diametrically opposite sides thereof with a longitudinally extending slot 7 having a long intermediate portion 9 of relatively large width and short opposite end portions 11 of relatively narrow width.

Within the bore of the member 1 and positioned axially thereof is shown a longitudinally extending tubular member 13 preferably formed of the same material as the member 1. The member 13, as shown, is of external and internal circular cross-section and has an end portion 15 which projects from the rearward end of the member 1. The forward end of the bore 17 of this member 13 is closed by a wall 19 integral with the circular lateral wall of said member, the opposite end of said member being open. Adjacent the slots 7 in the member 1 the member 13 is provided with spaced longitudinally extending rows of spaced perforations 21 placing the interior of the member 1 in communication with the bore of said member 13.

In the present construction the tubular member 13 is reciprocally but non-rotatively retained within the tubular member 1 by means of a retaining and splining sleeve 23 preferably formed of the same material as the members 1 and 13. This sleeve exteriorly thereof slidably fits the bore portion 24 of the member 1. The sleeve, which relatively tightly embraces the portion of the member 13 extending through it, has a rearwardly extending portion 25 formed adjacent each of opposite sides thereof with aligned perforations 27 (Fig. 5) with which is aligned a perforation 29 formed in the member 13. Through these aligned perforations 27 and 29 extend pins 31 constituted by the opposite legs of a wire bent to form a U, the portion 33 of said U connecting adjacent ends of these legs being received in an arcuate slot 35 formed in the exterior surface of the extension 25 of the sleeve. In this way the sleeve is fixedly secured to the member 13. As further shown (see Figs. 2 and 6), the sleeve 23 is integrally formed at diametrically opposite sides thereof with longitudinally extending outwardly projecting keys 37 slidably received in keywards formed by longitudinally extending slots 39 in the adjacent portion of the wall of the member 1, which slots open on the end of that member, the end walls 41 of these slots determining by contact therewith of the adjacent end of the sleeve the distance the member 13 may be slid to the left, as viewed in Fig. 2, relative to the member 1.

As further shown, the bore portion 24 of the member 1 is formed forwardly of the slots 39 with an annular internal rib 43, the adjacent portion of the tubular member 13 slidably fitting such rib. Forwardly of the rib 43 the member 13 is formed with an annular outwardly projecting external rib 45 which cooperates with the rib 43 to limit the distance the member 13 may slide to the right, as viewed in Fig. 12, relative to the member 1. As shown, the facing annular surfaces of the ribs 43 and 45 are of complementary frusto-conical shape as indicated at 47 (Fig. 2), one of such frusto-conical surfaces thus forming a valve seat for the valve presented by the rib having the frusto-conical surface complementary thereto.

As shown, the portion 24 of the bore of the member 1 is of larger diameter than the portion of the member 13 which it surrounds to form an annular space in which is received a compression spring 49 bearing under initial compression at one end against the rib 43 and at its opposite end against the sleeve 23 for normally holding the two members 1 and 13 in their relative position shown by Fig. 2.

As illustrated, the device is provided with two diametrically opposite narrow flexible spring cutters 51 the body portions of which are beveled at opposite edges as shown at 52 (Fig. 8) to form cutting edges. These cutters are positioned opposite the slots 7 in the member 1 and extend longitudinally of that member, each cutter being so positioned that in the position of parts shown by Figs. 1 and 2 the outer surface of the cutter lies substantially in a plane tangent to the projected surface of the bore of the member 1. At its forward end each cutter has a widened portion 53 of the same width as the adjacent portion 11 of the slot 7. Adjacent the forward end of said portion of the slot each cutter is bent to form an eye 55 through which and aligned perforations 57 (Fig. 3) in the wall of the member 1 extends a pin 59. The two pins 59, as shown, constitute the legs of a wire bent to a U shape, the arcuate base portion 61 of which U conforms to that portion of the outer surface of the member 1 which lies between those ends of the pins which are adjacent such portion. At its rearward end each spring cutter 51 has a portion 63 (Fig. 2) which is received in a recess 65 (Figs. 2 and 4) of the same width as that portion, which recess is formed at the exterior of the member 13 and opens forwardly and outwardly of said member. This end portion 63 of each spring cutter is bent to form an eye 67, through which eye extends a pin 69 projecting at opposite ends into perforations 71 formed in the member 13.

In the above way the spring cutters 51 are pivotally secured at their forward ends to the member 1 and at their rearward ends to the member 13. As shown, the pins 69 pivotally securing the spring cutters to the member 13 are positioned closer to the longitudinal axis of the device than are the pins 59 securing the forward ends of the cutters to the member 1. Also the portion 63 at the rearward end of each cutter, as clearly shown by Fig. 2, is bent downward at an angle from the body portion of the cutter for connecting the adjacent end of said body portion to the eye 67 through which the pin 69 extends. As a result of all this, when the member 13 is pushed forward, relative to the member 1, from its position shown by Fig. 2 to its position shown by Fig. 12, the cutters are forced to bow outwardly into their positions shown by Fig. 12. Further, when the cutters are so bowed the portions thereof which extend upwardly from the pins 69 securing them to the member 13 bear against the end wall 73 of the adjacent slot portion 11 in the member 1, and this serves non-positively to lock the members 1 and 13 in their relative positions shown by Fig. 12 against the effort of the coiled spring 49 tending to move them to their relative positions shown by Fig. 2 because, although the cutters by reason of their resiliency tend to unbow when they are in their positions shown by Fig. 12, the bearing of the cutters against said end walls of the slots prevents them from doing so. Only by forcibly pulling the member 13 rearwardly relative to the member 1 when the parts are in their positions shown by Fig. 12 can such non-positive lock be released.

As still further shown, the forward end of the member 13 carries a third resilient spring cutter 75. As shown, this cutter has a base portion 77 (Fig. 9) which is received in the slot 79 (Figs. 3 and 9) formed in the outer side of the end wall 19 of the member 13, and is removably secured to said wall by a screw 81 screw-threaded into said wall and extending through a perforation 82 (Fig. 11) formed in said base portion. This cutter has a portion 83 which extends radially outward from the member 13 and is bent away from the end of said member to form a curved portion 85, which latter portion, as indicated in Fig. 14, has its outer side in proximity to the surface of the bore of the member 1. At the outer end of this bent or curved portion the cutter has a portion 87 extending at an angle away from the adjacent end of the member 13 toward the side of the bore of the member 1 opposite such bend. The portion 87 of the cutter is transversely bent, relative to the plane of the body of that portion, along a line 89 (Fig. 11) toward the cutter base portion 77 to form a portion 90 (Figs. 9 and 10) the plane of which lies at an angle to the first mentioned plane so that said portion 90 is provided with a higher longitudinally extending edge 91 and a lower longitudinally extending edge 92 at opposite sides, respectively, of a surface which slants transversely of the cutter from said edge 91 to said edge 92. As shown by Fig. 11, which illustrates a development of the cutter, that is to say the cutter before it is bent at all, the blade of the cutter forming the portions 83, 85, 87 and 90 of the cutter is beveled along its edges throughout its length, as indicated at 93, to form cutting edges. The cutter 75 being formed of resilient spring material provides that the portion 87 thereof is resiliently bendable toward the base portion 77.

As further illustrated, rotatably and slidably mounted on the rearward portion of the exterior of the member 1 is a sleeve 95 having adjacent its forward end a tapered exteriorly screw-threaded portion 97. Adjacent the base of said portion 97 the sleeve has integrally formed therewith an outwardly extending circumferential flange 99 the forward side of which is formed with a pair of concentric ridges 101 of V-shaped cross-sectional profile extending to a sharp edge.

The juicer above described may be employed for extracting juice, say from an orange F (Figs. 14 to 16), by first holding the fruit in one hand and, by use of the other hand which grasps the handwheel 6, presenting the forward end of the member 1 to that end of the core portion of the fruit where the stem has attached it to the tree, and with the parts of the juicer in their relative positions shown by Figs. 1, 2 and 14, whereupon by pressing the forward end of the member 1 toward the fruit, and simultaneously oscillating the juicer several times, the saw teeth 5 will be caused to cut through the rind R of the fruit and into the latter. So cutting through the rind will cut therefrom the circumferential edge portion of a disc D (Fig. 14) of rind. After this circumferential edge portion of the disc is so cut the higher cutting edge 91 adjacent the free end of the bent over portion 90 of the cutter 75 will resiliently bear at its outer end portion against the outer side of the disc, which will cause said edge, starting at said free end, progressively to cut into the disc and, by reason of the adjacent transversely slanting surface of the cutter behind said edge, cause the portion 87 of the cutter to cut through the disc to its under side and sever that side from the underlying portion of the fruit and place the bend 85 of the cutter in the cut formed by the saw teeth 5, the oscillations of the juicer preferably being through at least one revolution so that an oscillatory stroke in one direction will secure this result.

Preferably, but not necessarily, the juicer is then pulled out of the fruit after the member 1 has penetrated the fruit a short distance, say about ⅝ inch, effective to cause the disc of rind to be cut and severed from the rest of the fruit in the way above explained. The disc, which is impaled on the inclined portion 87 of the cutter 75 and removably held thereon by the bent over portion 90 of the cutter, will be withdrawn from the fruit with the juicer. The disc may then be removed from the juicer. Such removal of the disc may be effected ordinarily by shaking the juicer with the parts in their positions shown by Fig. 2 or in their positions shown by Fig. 12.

After the disc has thus been removed the member 1 may be reinserted through the aperture in the rind left by the disc D, and with the parts still in their positions shown by Figs. 1, 2 and 14, to the same depth as before or a slightly greater depth, whereupon the sleeve 95 may be slid forward on the member 1 and rotated to screw its forward screw-threaded portion 97 into the aperture in the rind, until the forward side of the flange 99 of the sleeve 95 is brought against the portion of the rind surrounding the aperture, and cause the rind to be drawn against the circular teeth 101 on the flange and the points of those teeth to bite into the rind and thus make a tight joint between the rind and the juicer. This will bring the parts into their relative positions shown by Fig. 15.

After the sleeve is screw-threaded into the rind by the step just described the member 1 of the juicer may then, by means of the handwheel 6 and with the members 1 and 13 still in their relative positions shown by Fig. 2, be rotatably oscillated and pressed toward the fruit until the handwheel bears against the rearward end of the sleeve 95 as shown by Fig. 16. As a result of this the member 1 will cut about the core portion of the fruit to sever the membranes enclosing the wedge-shaped segments of the fruit a short distance back of the edges of such wedges. When the member 1 is moved to its position shown by Fig. 16 the member 13 may be slid forward in the member 1 to bring the parts into their positions shown by Figs. 12 and 16. Such movement of the member 13 relative to the member 1 will bow the spring cutters 51, the body portions of which cutters being relatively narrow say for example about ⅛ inch wide, will readily be forced outward through the pulp. After this last mentioned step is performed the fruit and juicer may be oscillated or rotated relative to each other through a sufficient angle to cause the cutters 51 further to sever the membranous portions of the fruit enclosing the segments of pulp. Preferably, as the final step of inserting the juicer into the fruit, the member 13 may then be forcibly pulled backward to release the hereinbefore described non-positive lock to unbow the cutters 51 and to close the valve afforded by the circular ribs 43 and 45. Then by squeezing, kneading, or otherwise manipulating the fruit the juice will be caused to flow through the slots 7 and perforations 21 into the bore of the member 13 whence to be ejected or sucked through such bore. The seeds S of the fruit may enter the slots 7, which will permit them to clear the cutters 51 when the latter are rotated, these slots being of sufficient width to permit the seeds to be pushed aside by the cutters 51 when they are unbowed. The perforations 21 in the member 13 effectively strain from the juice the seeds and pulp. While the member 1 is being moved into the fruit from its position shown by Fig. 15 to its position shown by Fig. 16 the cutter 75, which is oscillated with the member 1, will act to chop up such membranous and fibrous material at the core of the fruit that may enter the bore of that member.

It will be understood that within the scope of the appended claims wide deviations may be made from the form of the invention described without departing from the spirit of the invention.

I claim:

1. A citrus fruit juicer comprising a first member having a tubular portion provided with a cutter adjacent its forward end for cutting longitudinally through a fruit about its core when said cutter is presented to the fruit and said portion is rotated and simultaneously forced endwise into the fruit, said portion being formed with an opening in its side walls for permitting juice to enter the interior of said portion from the pulp of the fruit surrounding it, a second member reciprocally extending through said first member longitudinally thereof and rotatable therewith for receiving the juice entering said portion of said first member and discharging it at the exterior of the fruit, a flexible pulp and fruit fiber cutter extending longitudinally of said members and rotatable therewith, said flexible cutter being secured adjacent opposite end portions thereof to said first member and second member, respectively, whereby such flexible cutter may be flexed to bow laterally outward of said members into the pulp of the fruit by relative reciprocation of said members in one direction, said flexible cutter being unbowed to withdraw it from said pulp by relative reciprocation of said members in the opposite direction, and a sleeve rotatively and reciprocally carried by said first member at the exterior thereof, said sleeve having a portion for insertion in the opening which is formed in the rind of the fruit by the first mentioned cutter and also having a flange for engaging the portion of the rind about said opening for sealing the joint between said rind and said first member.

2. A citrus fruit juicer comprising a first member having a tubular portion provided with a cutter adjacent its forward end for cutting longitudinally through a fruit about its core when said cutter is presented to the fruit and said portion is rotated and simultaneously forced endwise into the fruit, said portion being formed with an opening in its side walls for permitting juice to enter the interior of said portion from the pulp of the fruit surrounding it, a second member reciprocally extending through said first member longitudinally thereof and rotatable therewith for receiving the juice entering said portion of said first member and discharging it at the exterior of the fruit, a flexible pulp and fruit fiber cutter extending longitudinally of said members and rotatable therewith, said flexible cutter being secured adjacent opposite end portions thereof to said first member and second member, respectively, whereby such flexible cutter may be flexed to bow laterally outward of said members into the pulp of the fruit by relative reciprocation of said members in one direction, said flexible cutter being unbowed to withdraw it from said pulp by relative reciprocation of said members in the opposite direction, and a sleeve rotatively and reciprocally carried by said first member at the exterior thereof, said sleeve having a screw-threaded portion for screwing it into that opening which is formed by the first mentioned cutter in the rind of the fruit and also having a flange which is forced against the portion of the rind about said opening for sealing the joint between such rind and first member when said portion of said sleeve is so screwed into said opening.

3. A citrus fruit juicer comprising a first member having a tubular portion provided with a cutter adjacent its forward end for cutting longitudinally through a fruit about its core when said cutter is presented to the fruit and said portion is rotated and simultaneously forced endwise into the fruit, said portion being formed with an opening in its side walls for permitting juice to enter the interior of said portion from the pulp of the fruit surrounding it, a second member reciprocally extending through said first member longitudinally thereof and rotatable therewith for receiving the juice entering said portion of said first member and discharging it at the exterior of the fruit, a flexible pulp and fruit fiber cutter extending longitudinally of said members and rotatable therewith, said flexible cutter being secured adjacent opposite end portions thereof to said first member and second member, respectively, whereby such flexible cutter may be flexed to bow laterally outward of said members into the pulp of the fruit by relative reciprocation of said members in one direction, said flexible cutter being unbowed to withdraw it from said pulp by relative reciprocation of said members in the opposite direction; the juicer having means for severing, from the underlying portion of the fruit, the disc cut from the rind of the fruit by the first mentioned cutter.

4. A citrus fruit juicer comprising a first member having a tubular portion provided with a cutter adjacent its forward end formed to cut a disc from the rind of a fruit and longitudinally through a fruit about its core when said cutter is presented to the fruit and said portion is rotated and simultaneously forced endwise into the fruit, said portion being formed with an opening in its side walls for permitting juice to enter the interior of said portion from the pulp of the fruit surrounding it, a second member reciprocally extending through said first member longitudinally thereof and rotatable therewith for receiving the juice entering said portion of said first member and discharging it at the exterior of the fruit, a flexible pulp and fruit fiber cutter extending longitudinally of said members and rotatable therewith, said flexible cutter being secured adjacent opposite end portions thereof to said first member and second member, respectively, whereby such flexible cutter may be flexed to bow laterally outward of said members into the pulp of the fruit by relative reciprocation of said members in one direction, said flexible cutter being unbowed to withdraw it from said pulp by relative reciprocation of said members in the opposite direction, a third cutter positioned adjacent the first mentioned cutter and rotatable therewith; said third cutter comprising a blade having a cutting edge for cutting through the disc cut from the rind of the fruit by said first mentioned cutter, to the under side of such disc, and severing the disc from the portion of the fruit underlying that disc.

5. A citrus fruit juicer comprising a first member having a tubular portion provided with a cutter adjacent its forward end formed to cut a disc from the rind of a fruit and longitudinally through a fruit about its core when said cutter is presented to the fruit and said portion is rotated and simultaneously forced endwise into the fruit, said portion being formed with an opening in its side walls for permitting juice to enter the interior of said portion from the pulp of the fruit surrounding it, a second member reciprocally extending through said first member longitudinally thereof and rotatable therewith for receiving the juice entering said portion of said first member and discharging it at the exterior of the fruit, a flexible pulp and fruit fiber cutter extending longitudinally of said members and rotatable therewith, said flexible cutter being secured adjacent opposite end portions thereof to said first member and second member, respectively, whereby such flexible cutter may be flexed to bow laterally outward of said members into the pulp of the fruit by relative reciprocation of said members in one direction, said flexible cutter being unbowed to withdraw it from said pulp by relative reciprocation of said members in the opposite direction; a third cutter carried by said second member and rotatable therewith, said third cutter comprising a flexible blade extending radially of said second member adjacent the first mentioned cutter; said blade having a portion disposed to cut through the disc cut from the rind of the fruit by said first mentioned cutter, to the under side of such disc when said cutters are rotated, for causing such blade to sever such disc from the portion of the fruit underlying that disc.

6. A citrus fruit juicer comprising a first member having a tubular portion provided with a cutter adjacent its forward end for cutting longitudinally through a fruit about its core when said cutter is presented to the fruit and said portion is rotated and simultaneously forced endwise into the fruit, said portion being formed with an opening in its side walls for permitting juice to enter the interior of said portion from the pulp of the fruit surrounding it, a second member reciprocally extending through said first member longitudinally thereof and rotatable therewith for receiving the juice entering said portion of said first member and discharging it at the exterior of the fruit, a flexible pulp and fruit fiber cutter extending longitudinally of said members and rotatable therewith, said flexible cutter being secured adjacent opposite end portions thereof to said first member and second member, respectively, whereby such flexible cutter may be flexed to bow laterally outward of said members into the pulp of the fruit by relative reciprocation of said members in one direction, said flexible cutter being unbowed to withdraw it from said pulp by relative reciprocation of said members in the opposite direction, the flexible cutter being operatively pivotally secured to said second member interiorly of said tubular portion of said first member, said opening in said tubular portion for permitting entrance of juice thereinto comprising a longitudinally extending slot through which said flexible cutter laterally extends when said cutter is so bowed, that portion of said flexible cutter which is adjacent the pivotal connection of said cutter to said second member being disposed when the cutter is bowed to contact the adjacent end of said slot to lock said first and second members non-positively in their relative position in which said cutter is so bowed.

7. A citrus fruit juicer comprising a first member having a tubular portion provided with a cutter adjacent its forward end for cutting longitudinally through a fruit about its core when said cutter is presented to the fruit and said portion is rotated and simultaneously forced endwise into the fruit, said portion being formed with an opening in its side walls for permitting juice to enter the interior of said portion from the pulp of the fruit surrounding it, a second member reciprocally extending through said first member longitudinally thereof and rotatable therewith for receiving the juice entering said portion of said first member and discharging it at the exterior of the fruit, a flexible pulp and fruit fiber cutter extending longitudinally of said members and rotatable therewith, said flexible cutter being secured adjacent opposite end portions thereof to said first member and second member, respectively, whereby such flexible cutter may be flexed to bow laterally outward of said members into the pulp of the fruit by relative reciprocation of said members in one direction, said flexible cutter being unbowed to withdraw it from said pulp by relative reciprocation of said members in the opposite direction, spring means for normally urging said first and second members toward and normally holding them in their relative position in which said flexible cutter is unbowed, the flexible cutter being operatively pivotally secured to said second member interiorly of said tubular portion of said first member, said opening in said tubular portion for permitting entrance of juice thereinto comprising a longitudinally extending slot through which said flexible cutter laterally extends when said cutter is so bowed, that portion of said flexible cutter which is adjacent the pivotal connection of said cutter to said second member being disposed when the cutter is bowed to contact the adjacent end of said slot to lock against the effort of said spring means said first and second members non-positively in their relative position in which said cutter is so bowed.

8. A citrus fruit juicer comprising a first member having a tubular portion provided with a cutter adjacent its forward end for cutting longitudinally through a fruit about its core when said cutter is presented to the fruit and said portion is rotated and simultaneously forced endwise into the fruit, said portion being formed with an opening in its side walls for permitting juice to enter the interior of said portion from the pulp of the fruit surrounding it, a second member reciprocally extending through said first member longitudinally thereof and rotatable therewith for receiving the juice entering said portion of said first member and discharging it at the exterior of the fruit, a flexible pulp and fruit fiber cutter extending longitudinally of said members and rotatable therewith, said flexible cutter being secured adjacent opposite end portions thereof to said first member and second member, respectively, whereby such flexible cutter may be flexed to bow laterally outward of said members into the pulp of the fruit by relative reciprocation of said members in one direction, said flexible cutter being unbowed to withdraw it from said pulp by relative reciprocation of said members in the opposite direction, spring means for urging said first and second members toward and normally holding them in their relative position in which said flexible cutter is unbowed, and cooperating means carried by said members at the interior of the first member and exterior of the second member, respectively, forming a valve and valve seat which are in contact when said members are in such position for preventing flow of juice through the first member about the exterior of the second member.

References Cited in the file of this patent

UNITED STATES PATENTS

| | | |
|---|---|---|
| 883,786 | Chatain | Apr. 7, 1908 |
| 1,747,957 | Silvens | Feb. 18, 1930 |
| 1,838,626 | Hurst | Dec. 29, 1931 |
| 1,882,065 | Cody | Oct. 11, 1932 |
| 2,117,278 | Ainsworth | May 17, 1938 |
| 2,243,025 | Wilson | May 20, 1941 |
| 2,475,559 | Wilson | July 5, 1949 |

FOREIGN PATENTS

| | | |
|---|---|---|
| 512,309 | Great Britain | Aug. 31, 1939 |
| 774,454 | France | Sept. 24, 1934 |